United States Patent [19]

Frieberg

[11] Patent Number: 4,538,313
[45] Date of Patent: Sep. 3, 1985

[54] METHOD OF FORMING A JOINED PAIR OF WEDGE-ACTION LOCK WASHERS

[75] Inventor: Bengt O. Frieberg, La Habra Heights, Calif.

[73] Assignee: Nobex AB, Mattmar, Sweden

[21] Appl. No.: 121,840

[22] Filed: Feb. 15, 1980

[51] Int. Cl.³ .............................................. B21D 53/20
[52] U.S. Cl. ........................................ 10/86 B; 10/73
[58] Field of Search ............... 411/531, 533, 149, 150; 10/73, 86 B

[56] References Cited
FOREIGN PATENT DOCUMENTS 2413760 11/1974 Fed. Rep. of Germany ...... 411/149
514923 11/1939 United Kingdom ................ 411/149

Primary Examiner—Mark Rosenbaum
Attorney, Agent, or Firm—Francis X. LoJacono

[57] ABSTRACT

A method of forming a joined pair fo wedge-action-type lock washers, wherein each lock washer has a cam surface and an oppositely disposed friction surface, the pair of washers being arranged so that their cam surfaces are installed in a juxtaposed face-to-face engagement, at which time the two lock washers are selectively joined together in such a manner as to allow lateral movement between each washer when rotational force is applied during the tightening of an associated fastening device.

4 Claims, 6 Drawing Figures

METHOD OF FORMING A JOINED PAIR OF WEDGE-ACTION LOCK WASHERS

BACKGROUND OF THE INVENTION

1. Field of the Invention

This invention relates generally to a lock-washer device, and more particularly to a method of joining a pair of lock washers in an engaging face-to-face arrangement which allows them to be separated under rotating forces.

2. Description of the Prior Art

As is well known in the art, various problems and difficulties are encountered in providing suitable means for lock washer devices to cooperate with fastener devices such as the typical bolt-and-nut type.

Several types of known lock-washer devices are being used in association with many types of bolt-and-nut combinations. However, these devices have features that restrict their use; and they are so designed that they must be positioned in a particular face-to-face arrangement in order to be employed as required.

As examples of the prior art, one can refer to U.S. Pat. Nos. 3,263,727 and 4,134,438. Thus, it can be understood that the various types of lock washers must be employed in pairs or they must be employed with second engaging cam surfaces.

One particular problem that arises in employing the above types of locking devices is that one must rely on labor having average skills to install the washers in correct relation to one another. However, a pair of such washers must be arranged so that the cam surfaces are engaged properly in order to provide the positive locking engagement required. If the face-to-face arrangement is not correct, the device becomes inoperative. There is always the chance that one can inadvertently install washers so that the cam face of one washer engages the toothed face of the second washer, which would be incorrect. Or, one can also inadvertently install the washers in a toothed-face-to-toothed-face arrangement, which would also be incorrect.

At present, great care must be taken by an installer to assure that the pair of lock washers are properly aligned in a cam-face-to-cam-face relationship.

SUMMARY AND OBJECTS OF THE INVENTION

The present invention comprises a pair of lock washers, wherein each washer includes a frictional surface and a cam surface, a bonding agent such as glue or an adhesive being applied at selected points between the two matched washers or to the inner and/or outer peripheral surfaces, thereby preventing the washers from becoming separated.

However, the selective use of and the type of bonding material will allow the washers to rotate freely in relation to one another when a rotational force is applied during the tightening of the associated fastener means.

In order for this type of locking device to function properly, it is imperative that the washers be allowed to rotate freely in relation to one another with the least possible resistance in the form of surface friction, adhesion, etc. If the washers are restricted from sliding freely up the cam surfaces of one another, the washer pair would then rotate as a single unit—thus preventing the cam-wedging action required to stop self loosening of the fastener caused by vibration, etc.

It is an important object of the present invention to provide a pair of matching lock washers wherein a bonding agent, such as glue, adhesive, etc., can be selectively applied between the two washers to hold them together as a single unit until rotational force is applied, allowing the engaging cam surfaces to freely rotate with respect to each other rather than to rotate as a single unit.

It is another object of the invention to provide a bonding agent at selected points on the opposing cam surfaces.

It is still another object of the invention to provide a bonding agent across the adjacent inner and/or outer cylindrical surfaces or edges of each washer, to prevent the washers from separating prior to being installed.

It is still another object of the invention of this type that, when the nut of a fastener is tightened (rotated in the tightening direction), the washer adjacent the nut is capable of rotating with the nut—closing the gap between the front cam faces—whereby the movement between the washers breaks the bond and they are free to move easily and perform their intended locking function.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only.

DESCRIPTION OF THE PREFERRED EMBODIMENT

Figure 1:
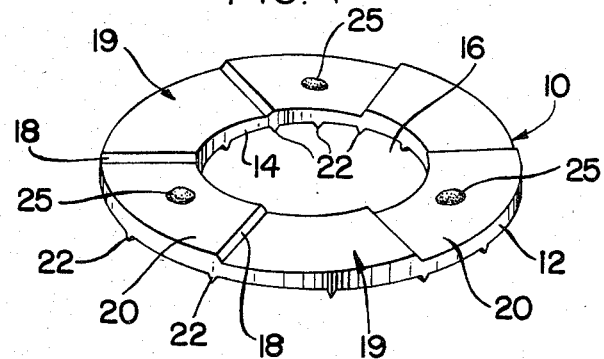
FIG. 1 is a perspective view of a typical lock washer having bonding material selectively disposed thereon.

Referring more particularly to the drawings, there is shown in FIG. 1 a typical lock washer, indicated at 10, having an outer peripheral wall or surface 12 and an inner peripheral wall on surface 14, the inner wall 14 defining a central opening 16 through which a typical fastening means is received. The fastening means is not shown herein but it is the common nut-and-bolt type fastener which—when associated with a lock washer—is intended to be locked in a secured position by rotation to the maximum degree.

Each washer further includes a cam surface and a frictional surface. The cam surface comprises a plurality of cam members 19, each having a frontal wall 18 and a substantially flat rearwardly inclined surface 20. Thus, to provide a lock-washer device, a pair of lock washers 10 must be matched and engaged in a cam-surface-to-cam-surface relation, the opposing frictional surface being located outwardly thereof, so as to engage both a nut or bolt on one side and the surface of a workpiece.

The frictional surface can be formed in any suitable manner but is herein shown and described as a plurality of radially extended teeth 22 positioned equidistant about the surface thereof.

In order to provide a complete lock-washer unit, two lock washers must be juxtapositioned whereby the cam surfaces are in a face-to-face engagement, as is well understood in the art. (See FIG. 2.) The positioning of the two washers is presently done at the time they are installed about the bolt member of a fastening device. As previously stated, due to human error the washers are sometimes not correctly oriented.

Accordingly, to prevent the incorrect arrangement of the cam surfaces, a releasably securing means is established between the two paired washers 10.

Figure 2:
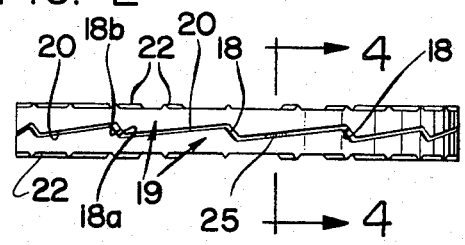
FIG. 2 is a side-elevational view of a pair of matching lock washers bonded together.
Figure 4:
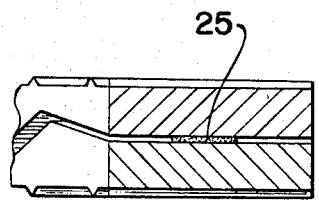
FIG. 4 is an enlarged cross-sectional view taken substantially along line 4—4 of FIG. 2.

In FIGS. 1, 2 and 4, the releasable securing means comprises a bonding material 25, selectively disposed on one or more mating inclined cam surfaces 20. Thus, as the two washers are brought into face-to-face contact with each other along the opposing cam surfaces, they will adhere to each other—thereby providing a single paired lock-washer unit.

It is further preferred that, when the two cam surfaces are engaged with each other, the opposing cam faces be so positioned that the front cam wall 18a of one washer is at a selective distance from the adjacent corresponding front cam wall 18b. (See FIG. 2.)

Thus, as the nut of the fastener means is tightened, the washer adjacent the nut will rotate with the nut, thus closing the gap between the front cam faces 18a and 18b, respectively. This horizontal rotational movement between the two washers allows the bond therebetween to be broken, whereby each washer is free to move laterally respective to the other and to perform its intended locking function.

It should be noted that any suitable bonding agent can be employed, such as glue, adhesive, etc. Thus, it is important to understand that the bonding material—once proved—will not allow the mating washers to separate, unless rotational forces are applied between the two washers, which understandably occurs during the tightening of a nut-and-bolt fastener.

Figure 5:
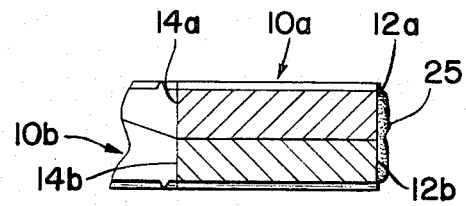
FIG. 5 is an enlarged cross-sectional view taken substantially along line 5—5 of FIG. 3.

Referring to FIG. 3, again the two washers are positioned in a cam-surface to cam-surface mating arrangement; however, the releasable securing means 25 is selectively located at one or more locations on the outer peripheral walls 12a and 12b of the respective washers 10a and 10b. FIG. 5 illustrates the bonding material 25 as being placed across the contiguous outer walls. It is further contemplated that the bonding material can be disposed across the inner walls 14a and 14b.

Figure 3:
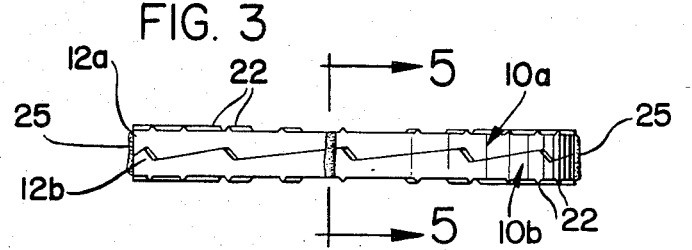
FIG. 3 is a side-elevational view of a pair of matching lock washers bonded together in an alternative manner.

However, with all bonding arrangements of the mating washers, space should be provided between the opposing frontal cam walls, as also seen in FIG. 3.

Figure 6:
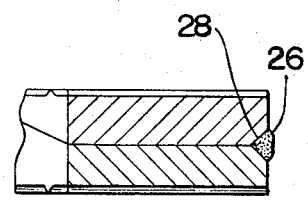
FIG. 6 is a cross-sectional view similar to FIG. 5, showing a different bonding arrangement.

FIG. 6 illustrates an additional form of bonding the two washers together. That is, glue or an adhesive 26 can be selectively applied to the opposing peripheral edges 28 of the outer walls thereof.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A method of forming a single lock-washer unit composed of a pair of mating lock washers, comprising the steps of:

forming a pair of washers, each having a frictional surface and an opposing cam surface;

applying a releasable securing means to the cam surface of at least one washer thereof, said releasable securing means comprising a bonding material that allows the mating washers to be freely separated by the relative rotational forces applied to said washers;

mating the opposing cam surfaces of each of said washers to form a signle lock-washer unit;

said cam surfaces comprising a frontal cam wall and a rearwardly inclined cam surface;

wherein the opposing frontal walls are spaced apart to allow movement therebetween; and selectively applying said bonding material to at least one inclined cam surface.

2. A method of forming a single lock-washer unit composed of a pair of mating lock washers, comprising the steps of:

forming a pair of washers, each having a frictional surface and an opposing cam surface;

applying a releasable securing means to the cam surface of at least one washer, said releasable securing means comprising a bonding material that allows the mating washers to be freely separated by the relative rotational forces applied to said washers;

mating the opposing cam surfaces of each of said washers to form a single lock-washer unit;

said cam surfaces comprising a frontal cam wall and a rearwardly inclined cam surface;

wherein the opposing frontal walls are spaced apart to allow movement therebetween; and selectively applying said bonding material to the outer peripheral walls of said washers.

3. A method of forming a single lock-washer unit composed of a pair of mating lock washers, comprising the steps of:

forming a pair of washers, each having a frictional surface and an opposing cam surface;

applying a releasable securing means to the cam surface of at least one washer thereof; and mating the opposing cam surfaces of each of said washers to form a single lock-washer unit;

wherein said releasable securing means comprises a bonding material; and wherein said bonding material is a glue that permits the mating washers to be separated when rotational force is applied thereto.

4. A method of forming a single lock-washer unit composed of a pair of mating lock washers, comprising the steps of:

forming a pair of washers, each having a frictional surface and an opposing cam surface;

applying a releasable securing means to the cam surface of at least one washer thereof; and mating the opposing cam surfaces of each of said washers to form a signle lock-washer unit;

wherein said releasable securing means comprises a bonding material; and wherein said bonding material is an adhesive that permits the mating washers to be separated when rotational force is applied thereto.

* * * * *